FOUR-TERMINAL IMPEDANCE NETWORK WITH VARIABLE ATTENUATION

Filed March 5, 1953 3 Sheets-Sheet 1

INVENTORS
NILS-OLOF JOHANNESSON
DAN BJÖRN HJALMAR LUNDVALL
BY [signature]
ATTORNEY

FOUR-TERMINAL IMPEDANCE NETWORK WITH VARIABLE ATTENUATION

Filed March 5, 1953 3 Sheets-Sheet 2

INVENTORS
NILS-OLOF JOHANNESSON
DAN BJÖRN HJALMAR LUNDVALL
BY Fredrik L. Haug
ATTORNEY INVENTORS
NILS-OLOF JOHANNESSON
DAN BJÖRN HJALMAR LUNVALL
BY [signature]
ATTORNEY United States Patent Office 2,782,378

Patented Feb. 19, 1957

2,782,378

FOUR-TERMINAL IMPEDANCE NETWORK WITH VARIABLE ATTENUATION

Nils-Olof Johannesson, Vartan, and Dan Björn Hjalmar Lundvall, Hagersten, Sweden, assignors to Telefonaktiebolaget L M Ericsson, Stockholm, Sweden, a company of Sweden Application March 5, 1953, Serial No. 340,645

Claims priority, application Sweden March 12, 1952

7 Claims. (Cl. 333—28)

There is a need in the modern carrier-frequency technique for the automatic or semi-automatic regulation of the residual attenuation for certain transmission lines in order to smooth the daily or seasonal variations of the attenuation. The attenuation variations to be compensated are dependent on the frequency and may be within one or several frequency ranges.

The present invention refers to a four-terminal impedance network, in which the attenuation can be varied around an average attenuation curve by varying from their normal value a number of resistances comprised in the impedance network. The average attenuation curve is then defined as the attenuation curve being a function of the frequency, which is obtained when the said resistances have certain suitably chosen values (normal values). Said impedance network is designed so that it is possible to dimension both the average attenuation and the attenuation variation as two given functions of the frequency, said functions being independent of each other. According to the present invention, this is achieved by having said impedance network consist of a first four-terminal network terminated by at least one series circuit consisting of an impedance and a first variable resistance, a second four-terminal network terminated by at least one parallel circuit consisting of an admittance and a second resistance, and a third four-terminal network, the pair of input terminals of which is connected in parallel or in series with the pair of input terminals of said first four-terminal network, and the pair of output terminals of which is connected in parallel or in series with the pair of input terminals of said second four-terminal network, whereby the ratio between said impedance and said admittance and the design and dimension of said four-terminal network are such, that the variation of the effective attenuation, with respect to frequency is independent of the product between said impedance and said admittance for the normal values of said first and said second resistances but dependent on said product for the values of said last mentioned resistances which differ from said normal value.

The four-terminal impedance network may be an equalizer directly in a carrier frequency connection or be the negative feed-back network of an amplifier. The variable resistances may be changed manually or automatically. In the latter case they suitably consist of indirectly heated thermistors, the heating circuits of which are passed by a current from a pilot frequency receiver.

Figure 1:
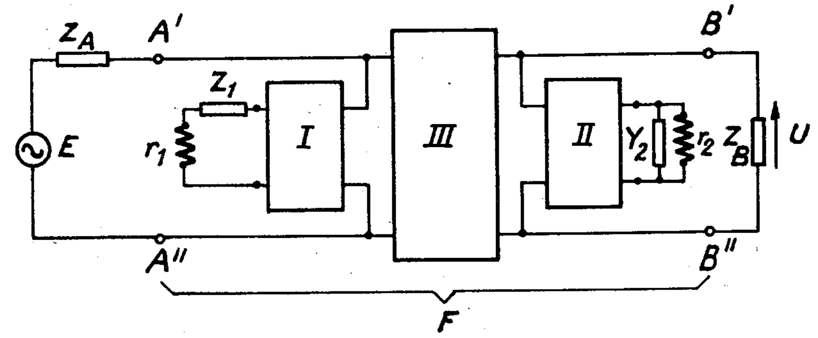
Figure 2:
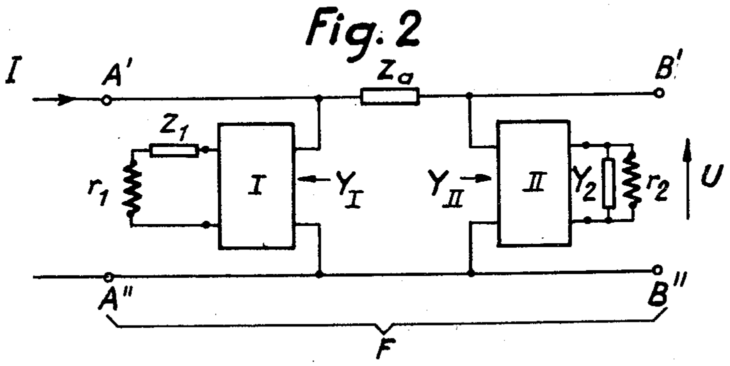
Figure 3:
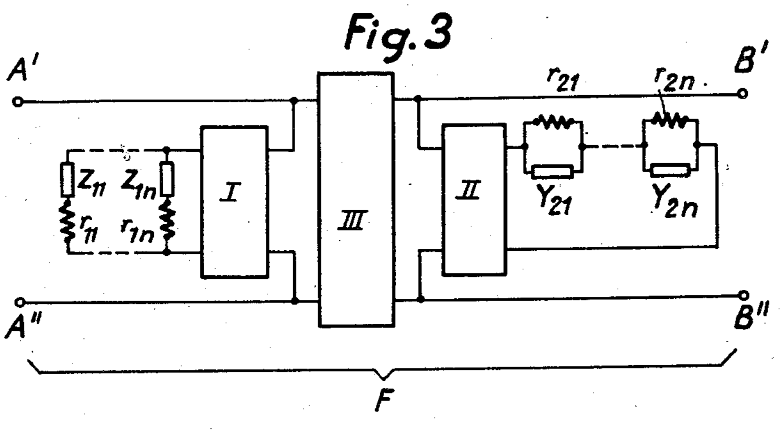
Figure 4:
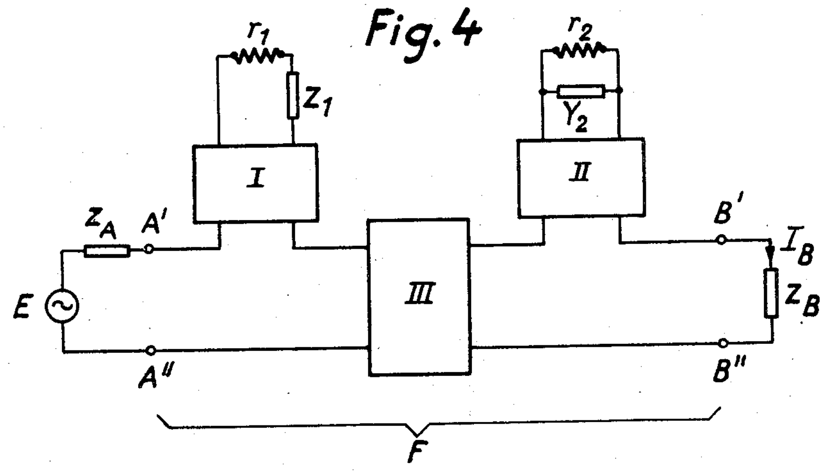
Figure 5:
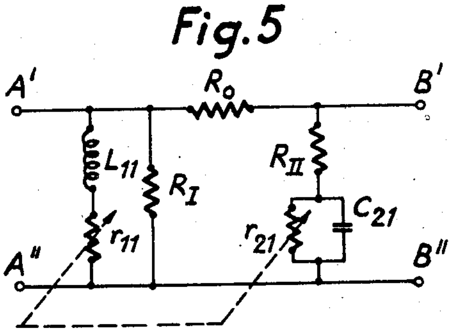
Figure 6:
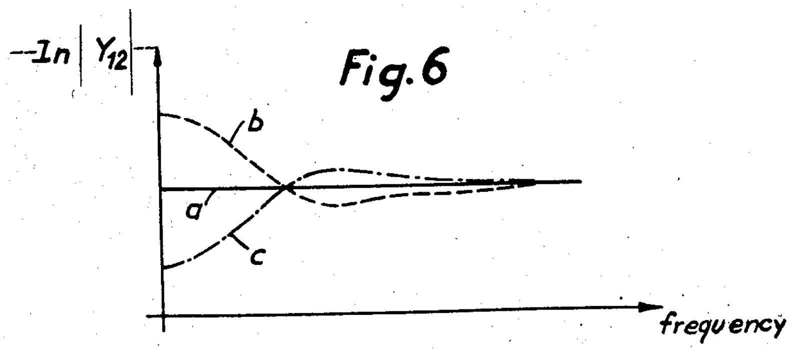
Figure 7:
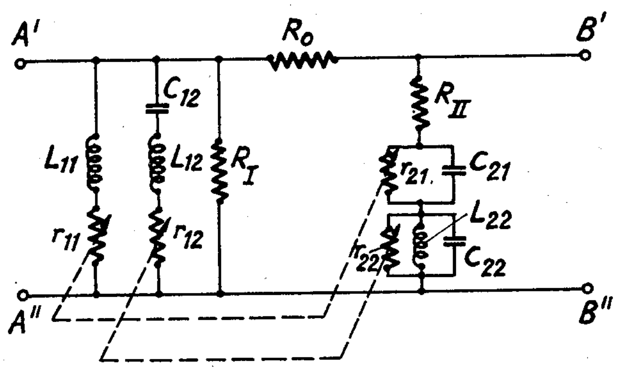
Figure 8:
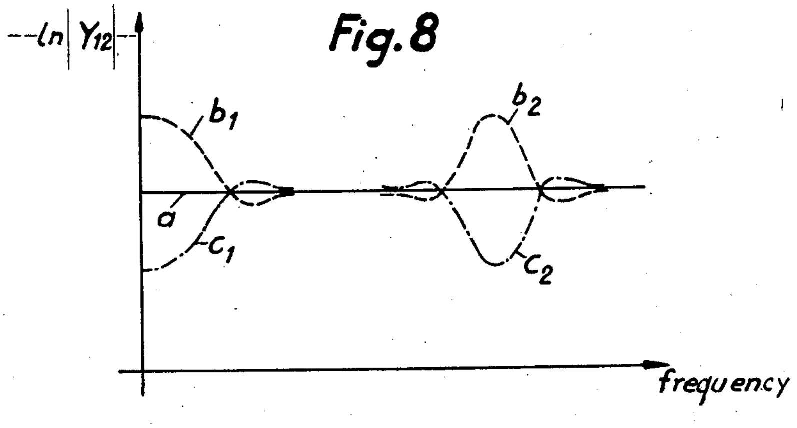

The invention will be described more closely with reference to the accompanying drawings, in which Fig. 1 shows a circuit diagram for an embodiment of an impedance network according to the invention, Fig. 2 shows an equivalent circuit diagram of the impedance network according to Fig. 1, Figs. 3 and 4 show modifications of the circuit diagram according to Fig. 1, Figs. 5 and 7 show connecting diagrams for impedance networks according to the invention, Figs. 6 and 8 show attenuation curves for the impedance networks according to Figs. 5 and 7.

Fig. 1 shows the principle of a four-terminal impedance network according to the invention. The four-terminal impedance network F is shown linked in a circuit with on one hand a generator having an E. M. F. E and an inner impedance $Z_A$, connected to the pair of terminals A′A″ and on the other hand a load impedance $Z_B$ connected to the pair of terminals B′B″. The impedance network F consists of two four-terminal networks I and II, the input admittances of which shunt the respective pair of terminals A′A″ and B′B″, and of a third four-terminal network III connected between the pairs of terminals A′A″ and B′B″. The four-terminal networks I and II are terminated by the impedance $r_1+z_1$ and the admittance $$\frac{1}{r_2}+Y_2$$

respectively, $r_1$ and $r_2$ being the resistances which are to give the desired attenuation of the variation $$ln\left|\frac{E}{U}\right|$$

E being the above mentioned E. M. F. and U the voltage over the load impedance $Z_B$.

The network according to Fig. 1 can in a known manner be transformed into the equivalent network shown in Fig. 2. For calculation purposes, it is immaterial whether the points A″ and B″ are connected to each other. The four-terminal network III may be represented by an equivalent $\pi$-network (the three elements in the $\pi$-network need not be physically realizable). According to the theoreme of Thévenin, the generator circuit may further be replaced by a shunt impedance $Z_A$ fed with a current I from a source of potential having a very high inner resistance. The shunt impedances in the above mentioned $\pi$-network and the impedances $Z_A$ and $Z_B$ may further be comprised within the four-terminal networks I and II. The diagram according to Fig. 2 is then obtained, in which $Z_0$ represents the series impedance in the $\pi$-network and $Y_I$ and $Y_{II}$ the input admittances in the respective four-terminal networks I and II.

The input admittance $Y_{ain}$ at one of the pair of terminals $a$ for a general four-terminal network, which at the pair of terminals $b$ is terminated by the impedance Z and the admittance Y respectively, is according to the theory of the four-terminal networks:

$$Y_{ain}=Y_{ta}\left(1+\frac{Z_{tb}-Z_{kb}}{Z_{kb}+Z}\right)=Y_{ka}\left(1-\frac{Y_{kb}-Y_{tb}}{Y_{kb}+Y}\right) \quad (1)$$

where $Y_{ta}$ represents the open-circuit admittance at the pair of terminals $a$ $Y_{ka}$ represents the short-circuit admittance at the pair of terminals $a$ $Z_{tb}$, $Y_{tb}$ represents the open-circuit impedance and respectively the open-circuit admittance at the pair of terminals $b$ $Z_{kb}$, $Y_{kb}$ represent the short-circuit impedance and respectively the short-circuit admittance at the pair of terminals $b$ The input admittances $Y_I$ and $Y_{II}$ for the four-terminal networks I and II, respectively, may according to (1) be written:

$$\left.\begin{aligned} Y_I&=a_1+\frac{b_1}{c_1+Z_1+r_1}\\ Y_{II}&=a_2+\frac{b_2}{c_2+Y_2+\frac{1}{r_2}}\end{aligned}\right\} \quad (2)$$

where $a_1$, $a_2$, $b_1$, $b_2$, $c_1$, $c_2$ are functions only of the properties of the four-terminal networks I and II.

The attenuation in the impedance network according to Fig. 2 is determined by the transmission admittance $$Y_{12}=Y_{I}+Y_{II}+Z_0Y_IY_{II}=\frac{I}{U} \qquad (3)$$

(It should be observed, that $Y_{12}$ becomes symmetric with relation to the pair of terminals A′ and B′.)

If the Equation 2 is introduced into the Equation 3, the following is obtained after reduction:

$$\left.\begin{aligned} Y_{12}=a_1+a_2+Z_0a_1a_2+&\frac{Y_2b_1(1+Z_0a_2)-Z_1b_2(1+Z_0a_1)}{(c_1+r_1+Z_1)\left(c_2+\frac{1}{r_2}+Y_2\right)}+\\ &\frac{b_1c_2(1+Z_0a_2)-b_2c_1(1+Z_0a_1)-Z_0b_1b_2}{(c_1+r_1+Z_1)\left(c_2+\frac{1}{r_2}+Y_2\right)}+\\ &\frac{\frac{1}{r_2}b_1(1+Z_0a_2)-r_1b_2(1+Z_0a_1)}{(c_1+r_1+Z_1)\left(c_2+\frac{1}{r_2}+Y_2\right)}\end{aligned}\right\} \qquad (4)$$

In order to make $Y_{12}$ independent of $Z_1$ and $Y_2$ when $r_1=r_{10}$ and $r_2=r_{20}$ the following must always be valid:

$$\left\{\begin{aligned} &Y_2b_1(1+Z_0a_2)-Z_1b_2(1+Z_0a_1)=0 && (5)\\ &b_1c_2(1+Z_0a_2)-b_2c_1(1+Z_0a_1)-Z_0b_1b_2=\\ &\qquad r_1b_2(1+Z_0a_1)-\frac{1}{r_2}b_1(1+Z_0a_2) && (6)\end{aligned}\right.$$

When $r_1=r_{10}$ and $r_2=r_{20}$ the following is valid:

$$Y_{12}=a_1+a_2+Z_0a_1a_2=Y_{120} \qquad (7)$$

$Y_{120}$ is here the special value of $Y_{12}$ which is obtained when the conditions (5) and (6) are met with for $r_1=r_{10}$, $r_2=r_{20}$. If the condition (5) is met with in the general case where $r_1\neq r_{10}$, $r_2\neq r_{20}$ it is possible to write:

$$Y_{12}=Y_{120}+\frac{\left(\frac{1}{r_2}-\frac{1}{r_{20}}\right)b_1(1+Z_0a_2)-(r_1-r_{10})b_2(1+Z_0a_1)}{(c_1+r_1+Z_1)\left(c_2+\frac{1}{r_2}+Y_2\right)} \qquad (8)$$

The last term on the right side of the Equation 8 represents the divergence $\Delta Y$ from the normal value $Y_{120}$, whereby $Z_1$ and $Y_2$ determine said divergence by means of the product $$(c_1+r_1+Z_1)\left(c_2+\frac{1}{r_2}+Y_2\right)$$

whereas the Equation 5 only determines the relation $Z_1/Y_2$. For given values of $r_1$ and $r_2$, $\Delta Y$ may thus be arbitrarily varied by suitable choice of $Z_1$ and $Y_2$. At given values of $Y_1$ and $Z_2$, on the other hand, the magnitude of and the sign for $\Delta Y$ may be changed by varying $r_1$ and $r_2$ around the normal values $r_{10}$ and $r_{20}$ respectively, whereby $Y_{12}$ and therewith the attenuation of the four-terminal impedance network F is varied around the normal value.

It is quite evident, that the resistances $r_1$ and $r_2$ should be varied in the same direction to obtain the greatest transmitted effect. They need however not be equally great or vary quite as much, though this is an important special case. In the latter case it is possible to use two identically equal, indirectly heated thermistors as variable resistances, the heating windings of said thermistors being passed by the same current.

It appears from the Equation 8 that when $Z_1$ and $Y_2$ are progressing towards $\infty$, $Y_{12}$ is progressing towards $Y_{120}$ independent of the value of $r_1$ and $r_2$. If there are $n$ frequency ranges fairly separated from each other and an interdependent attenuation regulation is desired, it may be obtained by means of a four-terminal impedance network F, in which the four-terminal network I is terminated by $n$ series circuits $$(r_{11}+Z_{11}),\ (r_{12}+Z_{12})\ \ldots\ (r_{1n}+Z_{1n})$$

in parallel, and the four-terminal network II with $n$ parallel circuits $$\left(\frac{1}{r_{21}}+Y_{21}\right),\left(\frac{1}{r_{22}}+Y_{22}\right)\ \ldots\ \left(\frac{1}{r_{2n}}+Y_{2n}\right)$$

series, as shown in Fig. 3.

These series- and parallel-circuits are connected in pairs so that one series circuit and one parallel circuit form a unit. In each such unit the impedance ($Z_{11}$, $Z_{12}$ . . . ) and the admittance ($Y_{21}$, $Y_{22}$ . . . ) is dimensioned according to the preceding rules so that each unit is given its own frequency range, within which the attenuation can be regulated by varying the two resistance ($r_{11}r_{21}$), ($r_{12}r_{22}$).

In the circuits shown up to now the impedance varying four-terminal networks I and II have been shunted by the pair of terminals of the four-terminal impedance network F. Nothing prevents the input terminals of the four-terminal networks I and II from being instead connected in series as shown in Fig. 4. By substituting an equivalent T-network (which needs not be physically realizable) for the four-terminal network III, and studying the transmission impedance $$Z_{12}=\frac{E}{I_B}$$

instead of $Y_{12}$, $I_B$ being the current through the load impedance $Z_B$, it is possible to obtain for the dimension and operation equations quite analogous to the Equations 1 . . . 8.

Generally, the attenuation curve for the four-terminal impedance network F is a function of the frequency also in the normal case $r_1=r_{10}$, $r_2=r_{20}$. For the important special case when the four-terminal networks I, II, III are resistive, the normal attenuation curve is straight. Fig. 5 shows a simple example thereof with regulation only at low frequencies.

The resistances $R_0$, $R_I$ and $R_{II}$ are resistive elements comprised in the four-terminal networks I, II and III. The inductance $L_{11}$ corresponds to the impedance $Z_{11}$ according to Fig. 3 and the condenser $C_{21}$ corresponds to the admittance $Y_{21}$. The resistances $r_{11}$ and $r_{12}$ are the variable resistances which here consist of indirectly heated thermistors, which are varied simultaneously and in the same direction by their heating windings being passed by the same current. The regulation curves for said impedance network appear from Fig. 6, which shows $ln|Y_{12}|$ as a function of the frequency. The curve $a$ is valid for the special values $r_{11}=r_{10}$, $r_{21}=r_{20}$ and is straight as shown above. The curve $b$ is valid for a value $r_{11}<r_{10}$ and $r_{21}<r_{20}$, whereas the curve $c$ is valid for $r_{11}>r_{10}$, $r_{21}>r_{20}$.

Fig. 7 shows another example of two regulations within different frequency ranges independent of each other, i. e. low frequencies as in the example of Fig. 5 and a band at higher frequencies. $R_0$, $R_I$, $R_{II}$, $L_{11}$, $r_{11}$, $C_{21}$ and $r_{21}$ represent the same elements as in Fig. 5. The series circuit $L_{12}$, $C_{12}$ corresponds to the impedance $Z_{12}$ and the parallel circuit $L_{22}$, $C_{22}$ corresponds to the admittance $Y_{22}$, while $r_{12}$ and $r_{22}$ represent the variable resistances connected together.

The regulating curves for the impedance network according to Fig. 7 appears from Fig. 8, which shows $ln|Y_{12}|$ as a function of the frequency. The following is here valid:

| | | | |
|---|---|---|---|
| curve $a$ for $r_{11}=r_{110}$ | $r_{12}=r_{120}$ | $r_{21}=r_{210}$ | $r_{22}=r_{220}$ |
| curve $b_1$ for $r_{11}<r_{110}$ | ---------- | $r_{21}<r_{210}$ | ---------- |
| curve $c_1$ for $r_{11}>r_{110}$ | ---------- | $r_{21}>r_{210}$ | ---------- |
| curve $b_2$ for | $r_{12}<r_{120}$ | ---------- | $r_{22}<r_{220}$ |
| curve $c_2$ for | $r_{12}>r_{120}$ | ---------- | $r_{22}>r_{220}$ |

We claim:

1. An attenuator having an attenuation versus frequency characteristic variable about an average attenuation versus frequency curve comprising an impedance network having input and output terminals, a second impedance network connected with the input terminals of said first network and terminated by a circuit including an impedance and a variable resistance, and a third impedance network connected with the output terminals of said first network and terminated by a circuit including an admittance and a second variable resistance the first, second and third networks being constructed and arranged so that the variation with respect to frequency of the effective attenuation of said attenuator corresponds to the average curve for normal values of said variable resistances and is varied from the average curve for other values of said variable resistances.

2. An attenuator according to claim 1, wherein said impedance and resistance of the terminating circuit of said second network are in series one with the other, and said admittance and resistance of the terminating circuit for said third network are connected in parallel.

3. An attenuator according to claim 2, wherein said second and third networks each include at least two terminating circuits responsive to vary the attenuation within different frequency ranges.

4. An attenuator according to claim 1, wherein the input of each of said networks is resistive.

5. An attenuator according to claim 1, wherein said resistances vary in the same direction.

6. An attenuator according to claim 1, wherein the image impedance of said attenuator is real for certain values of said resistances.

7. An attenuator according to claim 1, wherein said resistances are equal in value.

References Cited in the file of this patent

UNITED STATES PATENTS

| | | |
|---|---|---|
| 1,836,844 | Fry et al. | Dec. 15, 1931 |
| 2,153,743 | Darlington | Apr. 11, 1939 |
| 2,348,572 | Richardson | May 9, 1944 |
| 2,362,359 | Darlington | Nov. 7, 1944 |
| 2,682,037 | Bobis et al. | June 22, 1954 |